Oct. 27, 1959 G. E. FRANCK Re. 24,726

TUBE BENDING TOOL

Original Filed Dec. 27, 1951 2 Sheets-Sheet 1

INVENTOR.
George E. Franck,
BY
Schroeder, Mariam, Hofgren & Beck Atty's.

Oct. 27, 1959 G. E. FRANCK Re. 24,726

TUBE BENDING TOOL

Original Filed Dec. 27, 1951 2 Sheets-Sheet 2

INVENTOR.
George E. Franck,
BY
Schwarcz, Morrison,
Hofgren & Brady Attys.

United States Patent Office

Re. 24,726
Reissued Oct. 27, 1959

24,726

TUBE BENDING TOOL

George E. Franck, Riverside, Ill., assignor to The Imperial Brass Manufacturing Company, a corporation of Illinois Original No. 2,762,415, dated September 11, 1956, Serial No. 263,673, December 27, 1951. Application for reissue April 10, 1958, Serial No. 730,040

3 Claims. (Cl. 153—40)

Matter enclosed in heavy brackets [ ] appears in the original patent but forms no part of this reissue specification; matter printed in italics indicates the additions made by reissue.

This invention relates to a tube bending tool and more particularly to a tube bending tool which is admirably suited for bending resilient types of tubing, such as stainless steel and the harder grades of cooper tubing.

It is the general object of this invention to produce a new and improved tube bending tool.

A further object of the invention is to produce a tube bending tool of lightweight and yet sturdy construction.

Still another object of the invention is to produce a tube bending tool provided with a gear, together with means for securing any one of a plurality of mandrels of different sizes to the gear and provided with a shoe holding member adapted to hold any one of a plurality of shoes of different sizes immediately adjacent a mandrel for cooperation therewith to produce a tube bending tool capable of handling tubes of various diameters.

Other and further objects and features of the invention will be readily apparent from the following description and drawings, in which.

Figure 1:
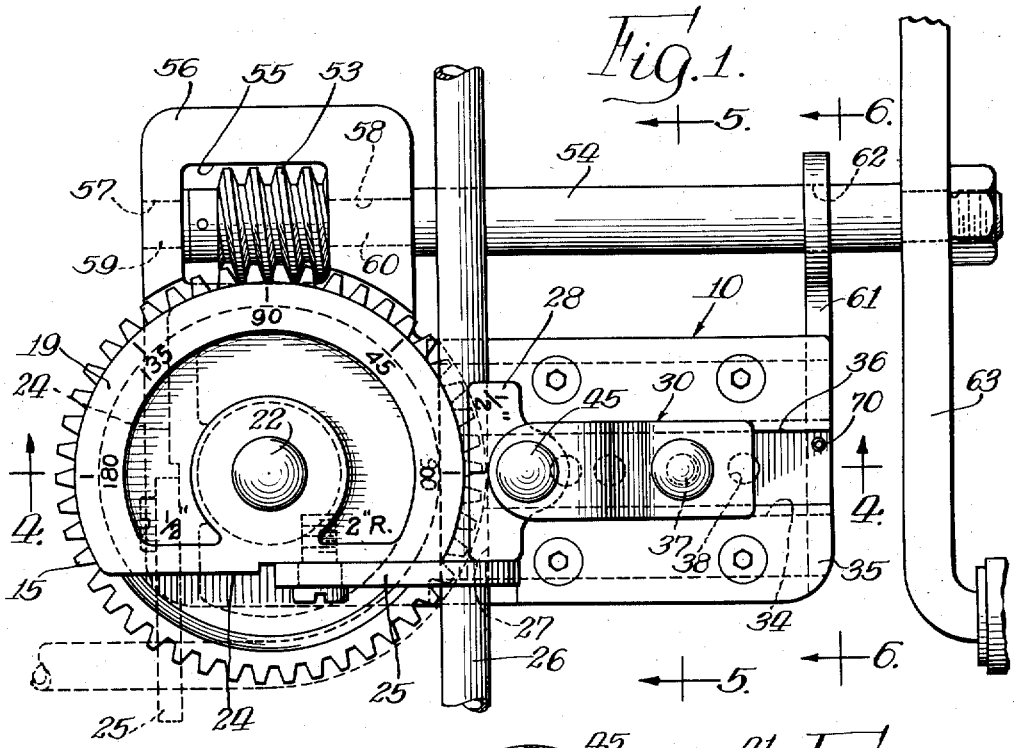
Fig. 1 is a top plan view of a tube bending tool embodying the invention.
Figure 2:
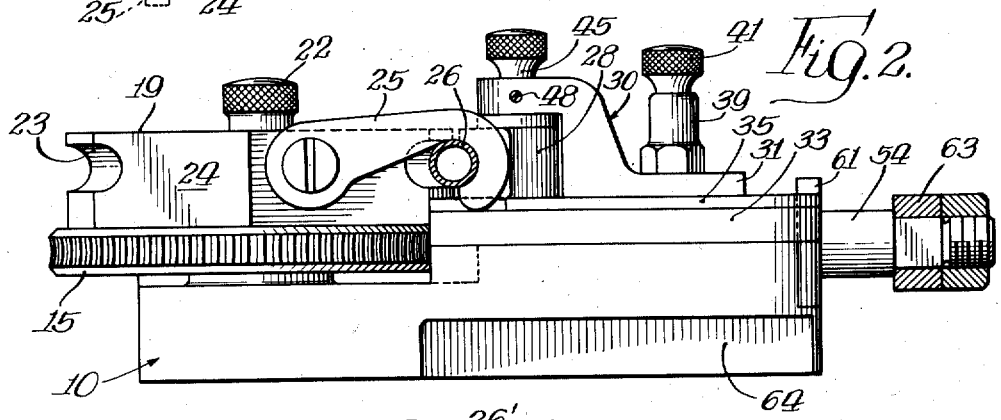
Fig. 2 is a side elevational view of the device shown in Fig. 1.
Figure 3:
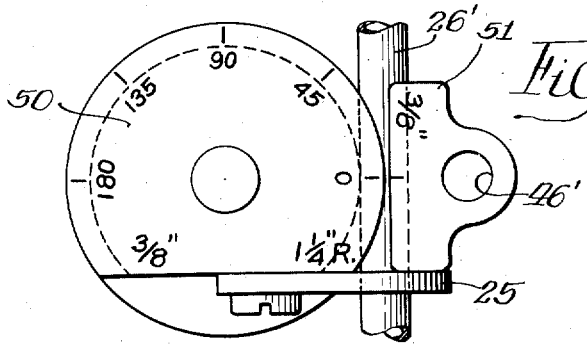
Figure 4:
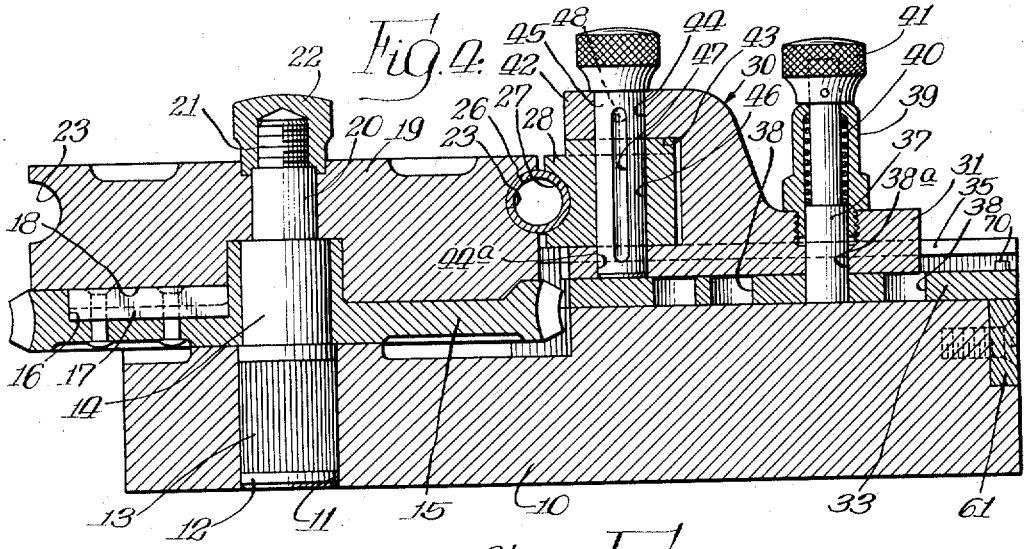
Figure 5:
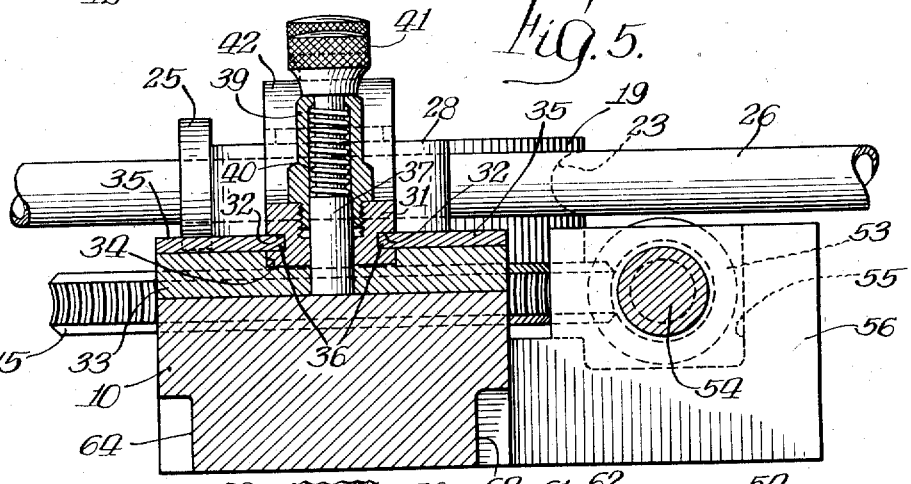
Figure 6:
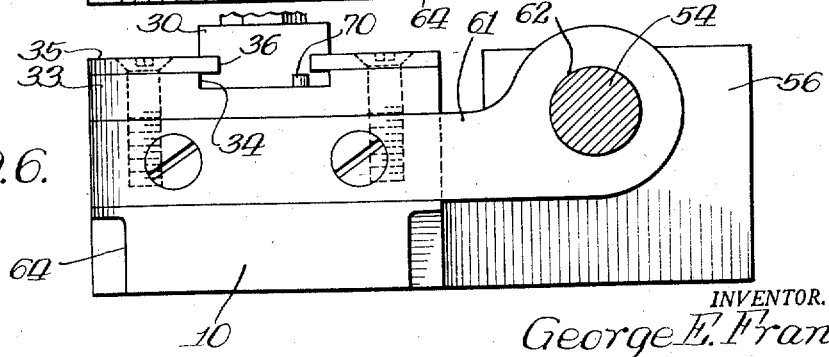

Fig. 3 is a top plan view of the mandrel and shoe portion of the tube bending tool showing its use with mandrels and shoes of different sizes; and Figs. 4, 5 and 6 are sectional views taken along lines 4—4, 5—5 and 6—6, respectively, of Fig. 1.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, the tube bending tool of this invention includes a substantially rectangular body member 10 preferably constructed of a lightweight material, such as aluminum alloy. Secured in an opening 11 in the body member is a bearing stud 12 (Fig. 4) provided with a serrated exterior surface 13 press fitted in the opening to hold the stud therein. The stud is formed with a first reduced portion 14 which rotatably supports a gear 15 on the body member. The gear is adapted to hold any one of a plurality of mandrels of different sizes so that the tool may be used to bend tubes of various diameters. For removably securing a mandrel to the gear, the latter is provided with a notch 16 on its upper surface in which is secured an elongated key 17 engageable with a recess portion 18 formed on a mandrel 19 placed over the gear to provide a driving connection between the gear and mandrel. The shaft 14 is provided with an upper portion 20 somewhat further reduced in diameter and threaded at 21 to engage the internal threads formed in a cap member 22 which serves to hold the mandrel in place over the gear.

The mandrel 19 is of usual construction having a peripheral groove 23 therein and a flat face 24 to which is pivotally secured a hook 25 adapted to engage a tube 26 placed in the tool for bending.

Cooperating with the groove 23 formed in the mandrel is a shoe member 28 provided with a groove 27. It will be noted that the grooves in the shoe and mandrel are semi-circular in cross section so as to form, when placed in adjacent cooperative relationship, a substantially cylindrical opening to engage the tube.

As mandrels of different sizes require the use of shoes of different sizes, means are provided for readily interchanging shoes. To this end, the shoe is removably held by a shoe holding member 30, which, as best shown in Figs. 4 and 5, is provided with a substantially rectangular base portion 31 having a pair of parallel elongated slots 32 formed on opposite sides thereof. The shoe holding member 30 is slidable toward and away from the gear properly to position the shoe and mandrel in cooperative relationship. To provide a long wearing surface slidably supporting the shoe holding member, the top of the body member adjacent the shoe holding member carries a flat steel plate 33 having a rectangular groove 34 formed therein. Secured to the plate on opposite sides of the groove is a pair of side plates 35, each preferably made of steel and having their edge portions 36 engaging the slots 32 and extending over the groove to form therewith a dovetail slot to hold the shoe holding member in place. The shoe holding member is preferably also made of steel although, if desired further to lighten the weight of the tool, the shoe holding member may be provided with a steel base plate slidable in the slot.

To secure the shoe holding member in adjusted position on the base member, the plate 33 is provided with a plurality of holes 38 spaced along the bottom of the groove 34 each engageable by a pin 37 slidably carried by the body member. To this end there is provided an opening 38a in the body member having internal threads engaging the threads formed on the bottom of a hollow post 39. The hollow in the post is aligned with the opening 38a and encloses a spring 40 engaging the pin 37 constantly to urge the same downwardly into one of the holes 38. A manually operable knob 41 is secured to the upper end of the pin so that the same may be retracted from an opening, the entire shoe holding member slid in the slot and the pin reengaged with another one of the holes 38 to position a shoe held therein at the proper distance from the mandrel.

To adapt the shoe holding member to support any one of a plurality of shoes of different sizes in adjacent cooperative relationship with a mandrel of corresponding size secured to the gear, the portion of the shoe holding member adjacent the mandrel is provided with an overhanging portion 42 which defines therebeneath a U-shaped slot 43 which extends from side to side of the holding member. The portion is provided with an opening 44 which slidably supports a pin 45 insertable through a suitable opening 46 formed in the shoe 28 and into an opening 44a formed in the bottom of the shoe holding member. The pin 45 is provided with an elongated slot 47 engageable by a pin 48 held in the upper portion 43 so as to prevent the pin from dropping out of the tool. By merely raising the pin 45 the shoe 28 may be removed and replaced with another shoe similarly constructed except for the radius of the groove 27.

From the part of the tool thus far described it will be clear that mandrels and shoes of different sizes may be used. To change the mandrels it is merely necessary to unloosen the cap 22 and lift the mandrel off the post 20 whereupon it can be replaced by a second mandrel, for example, such as the mandrel 50 shown in Fig. 3, which latter mandrel is provided with a suitable recess 18 to engage the key 17 on the gear and is held thereon by the cap member. Similarly it is possible to replace the shoe 28, as for example by the shoe 51 shown in Fig. 3, the latter shoe being provided with an opening 46' corresponding in size to the opening 46 shown on the shoe 28.

For rotating the gear 15 which carries the mandrel there is provided a worm 53 secured to a shaft 54. The worm is mounted in an opening 55 formed in a U-shaped member 56 secured to the body member and provided with bearing surfaces 57 and 58 which rotatably support suitably reduced portions 59 and 60 of the shaft so as to retain the shaft against longitudinal movement. Adjacent the opposite end of the body member the shaft is supported by an arm 61 secured to the body member and carrying a bearing 62 for the shaft. A suitable handle 63 is secured to the shaft so the same may be rotated to rotate the worm and gear.

When a tube is placed within the generally cylindrical opening formed by the cooperating grooves on the mandrel and shoe and the hook 25 is placed over the tube as shown in Fig. 1, rotation of the handle 63 produces rotation of the worm, gear and mandrel to draw the tube around the mandrel to the position shown in dotted lines in Fig. 1 and produce therein the desired bend. If a firm support for the tube bending tool is desired the latter may be placed in a vise or other suitable device and for this purpose the body member is provided along each side with parallel cutout portions 64. As the operator of the tube may shift his grip on the handle during the bending operation, or in the event he is unable to maintain a constant pressure on the handle, no backlash or reverse rotation of the gear and mandrel can occur through the worm shown. Thus even though pressure on the handle be varied or even removed during the bending operation reverse rotation will not occur and thus the hook 25 will not release its grip of the tube. As previously pointed out, this feature is particularly important when bending tubes of resilient material.

To retain the shoe holding member 30 in position in the groove 34, a pin 70 is pressed into a suitable opening formed in the bottom of the groove after the tool has been assembled. To insert a tube to be bent into the tool, the pin 37 may be raised against the tension of the spring 40 and the tool holding member slid outwardly toward the stop pin 70 to separate the shoe and mandrel. A tube may then be inserted between the shoe and the mandrel and the shoe holding member slid inwardly until the shoe carried thereby abuts the tube at which time the pin 37 may be released to slide into one of the holes 38 in the bottom of the groove to retain the shoe holding member in proper position relative to the mandrel and to the tube to be bent.

I claim:

[1. In a tube bending tool, a body member rotatably carrying a mandrel and having a way extending radially of the mandrel, means cooperable with the mandrel to form a tube bending orifice comprising a shoe holding member mounted in the way for sliding movement toward and away from the mandrel, means for securing any one of a plurality of shoes of different sizes to the shoe holding member, and means for securing the shoe holding member to the body member in a limited number of positions each differently spaced from the axis of rotation of the mandrel to position a shoe held therein in juxtaposed tube guiding cooperative relationship with the mandrel.]

[2. In a tube bending tool having a body member rotatably to carry a mandrel, means cooperable with the mandrel to form a tube bending orifice comprising a slot formed in the body member and extending radially of the axis of rotation of the mandrel, a shoe holding member having a portion slidably engaging the slot, means for securing any one of a plurality of shoes of different sizes to the shoe holding member, and a pin mounted on the shoe holding member and movable into engagement with any one of a plurality of holes formed along the bottom of the slot to secure the shoe holding member to the body member in any one of a plurality of positions each differently spaced from the axis of rotation of the mandrel to position a shoe held therein in juxtaposed tube guiding cooperative relationship with the mandrel.]

3. In a tube bending tool having a substantially rectangular body member of aluminum alloy *arranged for* rotatably supporting *any one of a plurality of tube-engaging mandrels graduated to cooperate one each with each of a plurality of different diameter tubes to be bent, and for use with a plurality of tube-engaging shoes graduated to cooperate one each with each of a plurality of different diameter tubes to be bent, each shoe having an opening therein* [a mandrel], *shoe positioning* means [cooperable with the mandrel to form a tube bending orifice] comprising a steel plate secured to one face of the body member and provided with a groove extending radially of the axis of [the] rotation of [the] *a selected* mandrel *supported on the body member*, a pair of steel plates secured in spaced parallel relationship to the first-mentioned plate and each having an edge extending over the groove to form therewith a slot, a shoe holding member having a portion slidably engaging the slot and a portion spaced above the body member and extending toward the mandrel, a pin carried by the last-mentioned portion of the shoe holding member and movable [downwardly] to engage [an] *the* opening in any one of [a] *the* plurality of shoes [of different sizes] removably to secure a *selected* shoe to the shoe holding member, and a second pin mounted on the shoe holding member and movable into engagement with any one of a plurality of holes formed along the bottom of the slot to secure the shoe holding member to the body member in any one of a plurality of positions each differently spaced from the axis of rotation of the mandrel to position [a] *the selected* shoe held therein in juxtaposed tube guiding cooperative relationship with the mandrel.

*4. In a tube bending tool arranged for use with any one of a plurality of tube-engaging mandrels graduated to cooperate one each with each of a plurality of different diameter tubes to be bent, and for use with a plurality of tube-engaging shoes graduated to cooperate one each with each of a plurality of different diameter tubes to be bent: a body member having means for rotatably and removably carrying a selected one of the mandrels and a way extending radially of the carrying means; and shoe positioning means comprising shoe holding means mounted in the way for sliding movement toward and away from the carrying means for retaining any selected one of the plurality of shoes outwardly adjacent the selected mandrel on the carrying means and means for securing the shoe holding means to the body member in a limited number of positions each differently spaced radially from the carrying means to retain the selected shoe in juxtaposed tube guiding co-operative relationship with the mandrel on the carrying means.*

*5. In a tube bending tool arranged for use with any one of a plurality of tube-engaging mandrels graduated to cooperate one each with each of a plurality of different diameter tubes to be bent, and for use with a plurality of tube-engaging shoes graduated to cooperate one each with each of a plurality of different diameter tubes to be bent, each shoe having an opening therein: a body member having means for rotatably and removably carrying a selected one of the mandrels; and shoe positioning means comprising means defining a slot extending radially of the carrying means, a shoe holding means mounted in the slot for sliding movement toward and away from the carrying means for retaining any selected one of the plurality of shoes outwardly adjacent the selected mandrel on the carrying means, and a pin mounted on*

*the shoe holding means and movable into engagement with any one of a plurality of hoes formed along the bottom of the slot to secure the shoe holding means to the body member in any one of a plurality of positions each differently spaced radially from the carrying means to retain the selected shoe in juxtaposed tube guiding cooperative relationship with the mandrel on the carrying means.*

References Cited in the file of this patent or the original patent

UNITED STATES PATENTS

| | | |
|---|---|---|
| 397,712 | Fowler | Feb. 12, 1889 |
| 578,416 | Neilson et al. | Mar. 9, 1897 |
| 655,259 | Miller | Aug. 7, 1900 |
| 682,671 | Condon | Sept. 17, 1901 |
| 807,854 | Neuert | Dec. 19, 1905 |
| 842,111 | Pedrick | Jan. 22, 1907 |
| 1,060,461 | Klarwasser | Apr. 29, 1913 |
| 2,171,907 | Beehler et al. | Sept. 5, 1939 |
| 2,371,695 | Lancaster | Mar. 20, 1945 |
| 2,455,138 | Perkins | Nov. 30, 1948 |
| 2,466,381 | Clouse | Apr. 5, 1949 |

FOREIGN PATENTS

| | | |
|---|---|---|
| 11,648 | Great Britain | of 1847 |
| 231,836 | Germany | Mar. 2, 1911 |
| 236,430 | Switzerland | June 16, 1945 |
| 921,749 | France | Jan. 20, 1947 |
| 925,027 | France | Mar. 24, 1947 |